United States Patent
Kawai et al.

(10) Patent No.: US 8,696,210 B2
(45) Date of Patent: Apr. 15, 2014

(54) TWO-PIECE RETAINER AND TWO-PIECE ROLLER BEARING

(75) Inventors: Hiromitsu Kawai, Iwata (JP); Makoto Nishikawa, Iwata (JP); Yasuko Gotoh, Iwata (JP)

(73) Assignee: NTN Corporation, Osaka (JP)

( * ) Notice: Subject to any disclaimer, the term of this patent is extended or adjusted under 35 U.S.C. 154(b) by 63 days.

(21) Appl. No.: 13/495,346

(22) Filed: Jun. 13, 2012

(65) Prior Publication Data

US 2012/0321233 A1    Dec. 20, 2012

(30) Foreign Application Priority Data

Jun. 17, 2011    (JP) .................................. 2011-135450

(51) Int. Cl.
*F16C 33/51*    (2006.01)
(52) U.S. Cl.
USPC .......................................... 384/470; 384/577
(58) Field of Classification Search
USPC .................. 384/470, 572, 577, 578
See application file for complete search history.

(56) References Cited

U.S. PATENT DOCUMENTS

| 5,735,614 | A |   | 4/1998 | Isogawa |
|---|---|---|---|---|
| 6,068,408 | A | * | 5/2000 | Mutoh et al. ................... 384/523 |
| 7,220,060 | B2 | * | 5/2007 | Kono et al. ..................... 384/577 |
| 7,789,570 | B2 | * | 9/2010 | Tsujimoto ...................... 384/572 |
| 2002/0085783 | A1 |   | 7/2002 | Yokota |
| 2003/0077017 | A1 | * | 4/2003 | Fugel et al. ................... 384/578 |

FOREIGN PATENT DOCUMENTS

| JP | 9-72332 | 3/1997 |
|---|---|---|
| JP | 2000-240660 | 9/2000 |
| JP | 2002-195270 | 7/2002 |

\* cited by examiner

*Primary Examiner* — Thomas R Hannon
(74) *Attorney, Agent, or Firm* — Wenderoth, Lind & Ponack, L.L.P.

(57) ABSTRACT

An object of the present invention is to prevent loss of oil film and improve lubrication performance of the bearing by eliminating angled portions at butting surfaces in a two-piece retainer. A two-piece retainer is made by assembling a pair of semi-annular retainer parts into an annular structure. As assembled, lubricant reservoir grooves are formed, each by two arc-shaped groove wall surfaces which are formed on both sides of the butting surface, and by a groove bottom which is formed at a region including the butting surface.

11 Claims, 6 Drawing Sheets

Fig. 7       PRIOR ART

TWO-PIECE RETAINER AND TWO-PIECE ROLLER BEARING

CROSS-REFERENCE TO RELATED APPLICATION

The priority application number JP 2011-135450 upon which this patent application is based is hereby incorporated by reference.

BACKGROUND OF THE INVENTION

1. Field of the Invention

The present invention relates to a two-piece retainer and a two-piece roller bearing including the retainer. The bearing may be used in a conrod large end of an automotive engine or in an idler of a transmission.

2. Description of the Related Art

In automotive engines, the crank pins and the crank arms are formed integrally with each other, and for this reason, the bearing used in the conrod large end is a two-piece roller bearing. Accordingly, the bearing retainer also has a two-piece construction.

The two-piece retainer is constituted essentially by two halves. The two semi-annular retainer parts are butted to each other at their divided surfaces to form an annular structure. The retainer is guided as the retainer's outer diameter surface makes partial contact with the inner diameter surface of the bearing's outer ring; or if the roller bearing does not have an outer ring but has a retainer, the retainer is guided as the retainer's outer diameter surface makes partial contact with the inner diameter surface of the housing. During this contact, there is a case where a film of lubricant is cut and lost by angled portions, (which include burrs and edges resulting from machining processes; hereinafter this definition applies) that are present on the butting surfaces of the retainer parts. Loss of oil film means insufficient lubrication of the bearing, which can be a cause of reduced life of the bearing.

In an attempt to solve this problem of lost oil film caused by angled portions, there is known a technique as implemented in a roller bearing retainer 1 shown in FIG. 7 according to Prior art 1, where chamfer 5 is provided at the angled portion which is made by a butting surface 3 of the semi-annular retainer part 2 and the part's outer diameter surface 4 (Patent Literature 1). Each retainer part 2 has pockets for holding rollers 6.

However, there is still a risk that new angled portions 7 will be formed along boundary regions between the sloped surfaces of the chamfers 5 and the outer diameter surfaces 4, and loss of oil film will be caused by these angled portions 7.

A potential advantage in this case, however, is that butting two portions each having the chamfer 5 together will form a V-shaped groove, which serves as a lubricant reservoir for improved lubrication by, for example, supplying lubricant to regions where lubrication becomes insufficient due to any reason such as loss of oil film.

Another technique is implemented in Prior art 2 in FIG. 8, where in each region of the outer diameter surface 4 which includes abutting surface 3 a cutoff is made so that a two-piece retainer 1 has a gentler arc surface 9 (Patent Literature 2). In this case, however, there can be cases where the portion including the butting surface 3 is centrifugally expanded in radially outward directions, bringing angled portions 10 into contact with the inner diameter surface of the housing, resulting in loss of oil film. It should be noted here that in this example, there is no lubricant reservoir 8 (see FIG. 7) such as formed in the previous example.

Further, still another technique is implemented in Prior art 3 in FIG. 9, where each region of the outer diameter surface 4 which includes a butting surface 3 is cut off to be a flat surface 11 (Patent Literature 3). In this case again, there can be cases like in the previous example in FIG. 8 where the portion including the butting surface 3 is centrifugally expanded in radially outward directions, bringing angled portions 10 into contact with the inner diameter surface of the housing, resulting in loss of oil film. Note that there is no lubricant reservoir formed in this example, either.

CITATION LIST

Patent Literature

Patent Literature 1: JP-A-H09-72332 (FIG. 4)
Patent Literature 2: JP-A-2000-240660 (FIG. 2)
Patent Literature 3: JP-A-2002-195270 (FIG. 1)

BRIEF SUMMARY OF THE INVENTION

Technical Problem

As described above, conventional two-piece retainers have angled portions 7, 10 at their butting surfaces 3, and therefore have a risk of losing oil film.

It is therefore an object of the present invention to provide a two-piece retainer which has no angled portions left in its butting surfaces and therefore can reliably eliminate the risk of losing oil film while improving lubrication performance of the bearing, as well as to provide a two-piece roller bearing including the retainer.

Solution to Problem

In order to achieve the object, the present invention offers a two-piece retainer provided by an annular assembly of a pair of semi-annular retainer parts each representing a half of the retainer and having a predetermined number of roller holding pockets. The two retainer parts as assembled together provide a groove wall surface on each side of their shared butting surface on an outer diameter surface of each of the retainer parts. Each of the groove wall surfaces is provided by an arc surface continuing gently to a cylindrical surface of the retainer part, and a groove bottom is formed in a region including the shared butting surface of the retainer parts. The groove wall surfaces on two sides and the groove bottom form a lubricant reservoir groove.

With the above-described arrangement of the two-piece retainer, the pair of semi-annular retainer parts may be made by actually cutting an annular retainer material into two pieces. Then, these two pieces are butted together at their butting surfaces to form an annular structure. Alternatively, a resin molding technique, for example, may be employed to form the two semi-annular retainer parts without using the cutting process. Then, like the case described above, the two pieces are butted together at their butting surfaces to form an annular structure.

When used, the retainer roller bearing may not have track rings and may be constituted only by a retainer and rollers which are housed in and held by the pockets formed in the retainer. Also, the retainer roller bearing may have only one track provided by an outer ring, or may have two tracks provided by an outer ring and by an inner ring. The track rings may be used in their appropriate combinations in the retainer roller bearing.

On both sides of the butting surface, curved groove wall surfaces are provided so that the end of the butting surface serves as a groove bottom. Since these groove wall surfaces are provided by arc surfaces, there is no angular contact (edge contact) during operation when the retainer's outer diameter surface makes contact with and guided by the inner diameter surface of the partner member. Therefore, loss of oil film is prevented.

Also, in actual use, lubricant is supplied and is present when the bearing rotates. During this rotation, lubricant is held in each lubricant reservoir groove which is formed by the groove wall surfaces and the groove bottom, and is supplied into the bearing as the retainer rotates. The lubricant reservoir groove is not a specifically intended means for supplying lubricant but is a function as result of forming the arc-shaped groove wall surfaces which are intended as means for preventing the above-described loss of oil film. These surfaces also work advantageously by forming reservoirs of lubricant.

Advantageous Effects of Invention

As described, the present invention prevents loss of oil film which is likely to be caused by angled portions formed at butt regions in the two-piece retainer. Therefore, the present invention eliminates a cause of poor lubrication, and thereby extends bearing life. Another advantage is further improved lubrication performance by the lubricant reservoir grooves formed by the arc-shaped groove wall surfaces which are designed to prevent loss of oil film.

These and other objects, advantages and features of the invention will become apparent from the following description thereof taken in conjunction with the accompanying drawings which illustrates specific embodiments of the invention.

DETAILED DESCRIPTION OF THE INVENTION

Figure 1:
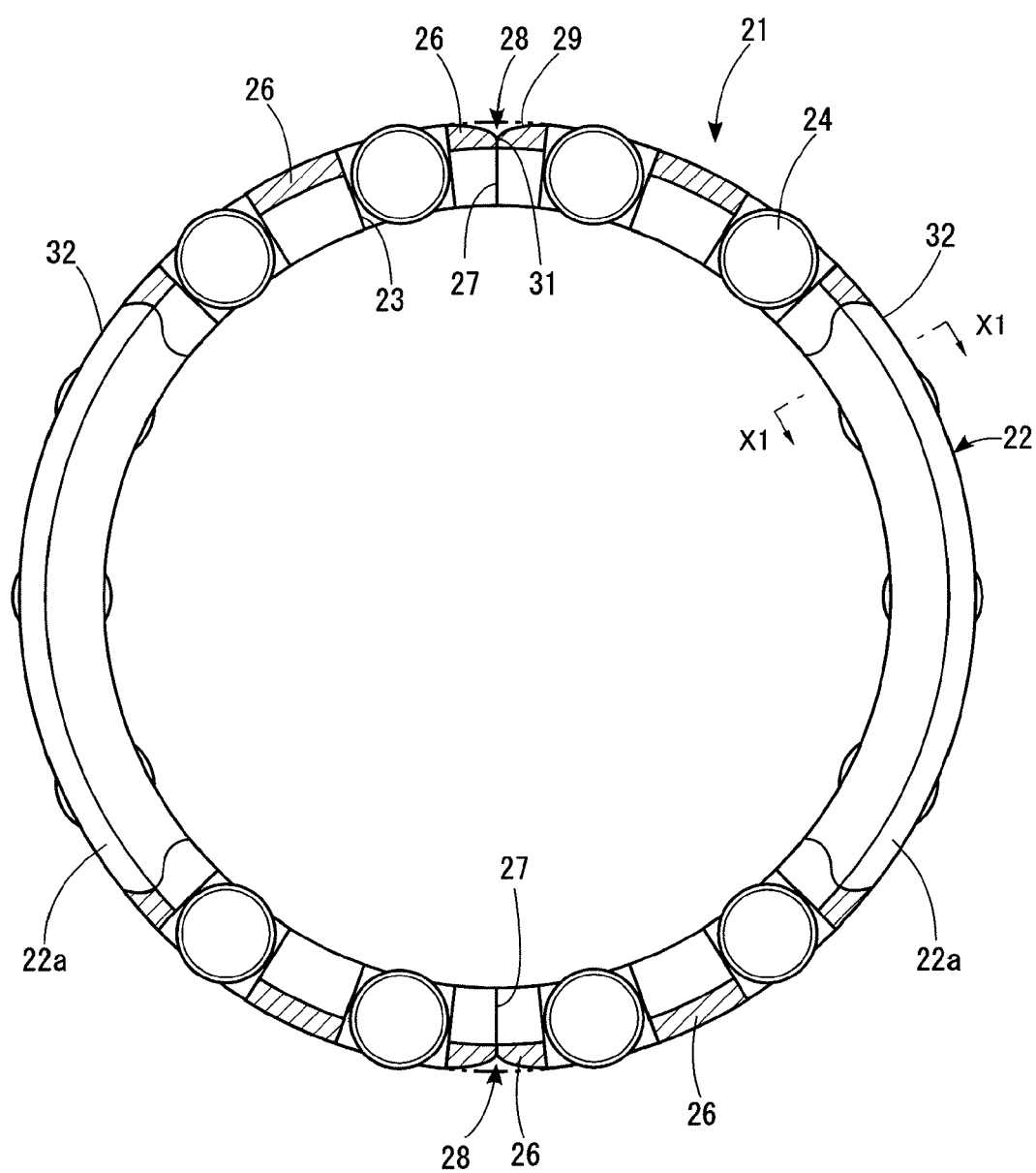
FIG. 1 is a front view, showing a vertical section of a retainer roller bearing according to Embodiment 1.

Hereinafter, embodiments of the present invention will be described based on the attached drawings.

Embodiment 1

FIG. 1 through FIG. 4 show a retainer roller bearing 21 according to Embodiment 1, which does not have track rings and is constituted by a retainer 22 and a predetermined number of rollers 24 housed in and held by pockets 23 formed in the retainer 22. The retainer 22 includes a pair of left and right annular portions 25 (see FIG. 2) opposed to each other axially of the bearing; and axially extending pillar portions 26 connecting the annular portions 25 with each other at a predetermined circumferential interval.

It should be noted here that the retainer roller bearing 21 described herein includes needle roller bearings which make use of retainers.

The retainer 22 is made by butting a pair of semi-annular retainer parts 22a into an annular structure. Each retainer part 22a is an axially divided half of an annular retainer resulting from symmetrically halving by a center plane of symmetry which cuts through two pillar portions 26.

When the pair of retainer parts 22a are butted together into an annular structure, the retainer 22 has lubricant reservoir grooves 28 on its outer diameter surface at each region of the butting surfaces 27. The lubricant reservoir groove 28 is formed by groove wall surfaces 29 (see FIG. 3) which oppose symmetrically to each other on an outer diameter surface side of the butting surface 27, and a groove bottom 31 which represents an outer-diameter-side end of the butting surface 27.

Each of the groove wall surfaces 29 is provided by an arc surface which merges gently (without steps or angled portions) at its boundary 33 with a cylindrical surface 32 of the retainer part 22a of a curvature radius R1, and has a gradually decreasing curvature radius R2 starting from the boundary 33 toward the butting surface 27. Since the butting surface 27 has its outer-diameter-side end serving as the groove bottom 31, the groove bottom 31 of the lubricant reservoir groove 28 has a virtually zero width in this embodiment.

When manufacturing the semi-annular retainer parts 22a, a cutting process is performed before dividing an annular retainer material into two halves, to form the lubricant reservoir grooves 28 (see alternate long and two short dashes lines in FIG. 2), i.e., two sets of the groove wall surfaces 29 and the groove bottom 31, in each region along the center plane of symmetry which includes two pillar portions 26 and annular portions 25 supporting the ends of these pillar portions 26.

Figure 2:
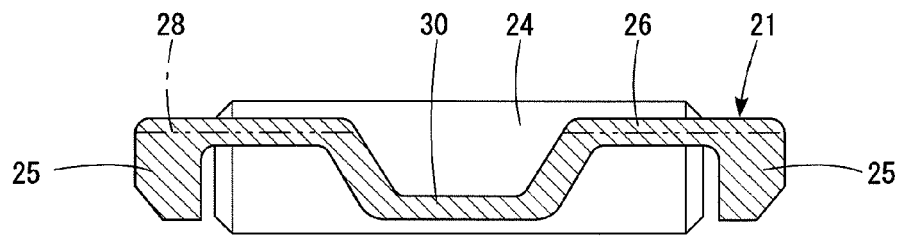
FIG. 2 is a sectional view taken in lines X1-X1 in FIG. 1.
Figure 3:
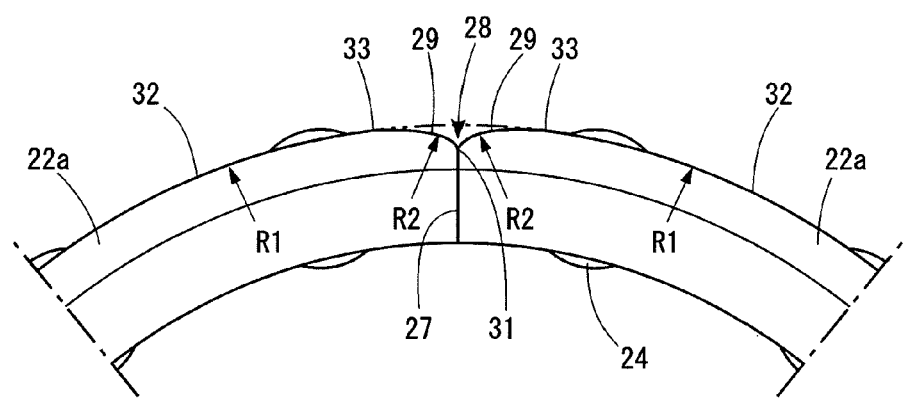
FIG. 3 is an enlarged fragmentary front view of a portion shown in FIG. 1.

If the pillar portion 26 has a bent recess 30 as shown in FIG. 2, this portion is not formed with the lubricant reservoir groove 28. If the pillar portion 26 does not have a bent recess and has a straight cylindrical shape, the lubricant reservoir groove 28 is formed in the entire length of the pillar portion 26 as well as in the annular portions 25 on both sides thereof.

After the lubricant reservoir grooves 28 are formed, the annular material is divided at the above-described groove bottoms 31 by cutting through the above-described two portions 26 along the plane of symmetry, to obtain a pair of mutually symmetrical retainer parts 22a which have butting surfaces 27 continuing smoothly to groove bottoms 31.

Another method of manufacturing the retainer part 22a is dividing an annular retainer material first, and then forming the groove wall surfaces 29 by cutting. Still another method may be to use a resin molding technique to form a semi-annular retainer part 22a which has groove wall surfaces 29.

The retainer 22 and the retainer roller bearing 21 including the same according to Embodiment 1 are as have been described thus far. After placing the rollers 24 in the pockets 23, the two retainer parts 22a are assembled together at their butting surfaces 27 into an annular structure. Under the assembled state, the retainer roller bearing 21 is used to support a conrod large end 35 (see FIG. 4) of an engine for example.

Figure 4:
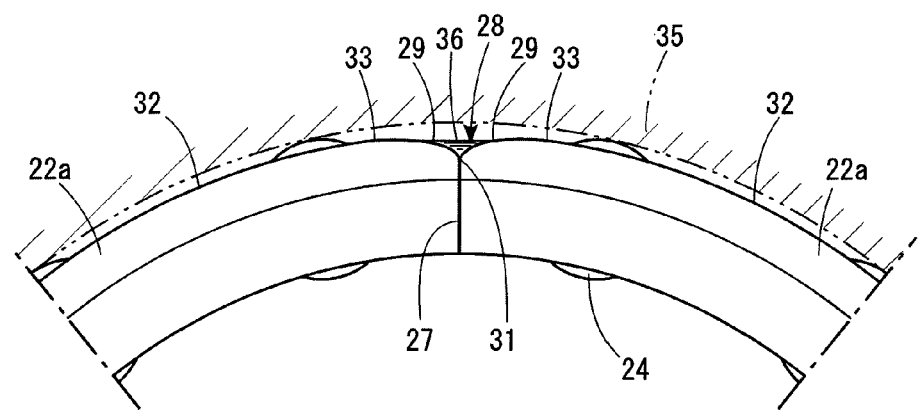
FIG. 4 is an enlarged fragmentary front view of the portion shown in FIG. 1, depicting a state of operation.

In use, lubricant is filled inside the conrod large end 35, and the roller bearing's retainer 22 is guided by making partial contact with the inner diameter surface of the conrod large end 35 (see FIG. 4). Under the state of this contact, even if the bearing is centrifugally expanded, there is no angular contact since the groove wall surfaces 29 are arc surfaces and there is no angled portions protruding in radially outward directions. Thus, the arrangement reliably prevents loss of oil film.

The retainer roller bearing 21 is supplied with lubricant 36, part of which is held in the lubricant reservoir groove 28. Since the lubricant 36 held in the groove is moved to the inner circumferential surface of the conrod large end 35 as the retainer 22 rotates, the arrangement improves lubrication of the bearing. Also, even if there is loss of oil film caused by some part of the retainer 22 for any reason, the lubricant 36 in the lubricant reservoir groove 28 is supplied to the region where oil film is lost, thereby eliminating the loss of lubrication.

Embodiment 2

Figure 5:
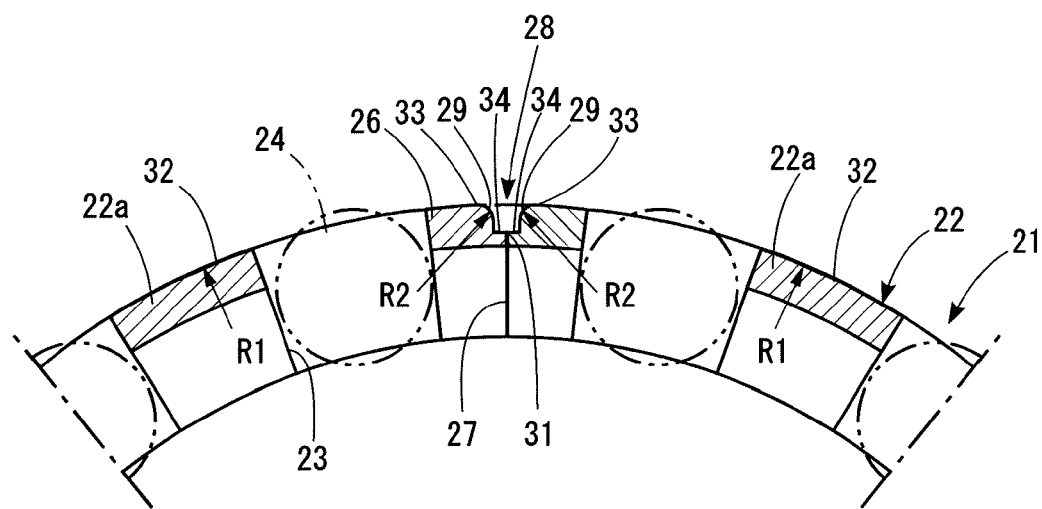
FIG. 5 is an enlarged fragmentary front view in vertical section of a retainer roller bearing according to Embodiment 2.

FIG. 5 shows a two-piece retainer 22 according to Embodiment 2, which differs from Embodiment 1 in the shape of the lubricant reservoir groove 28. Specifically, in this embodiment, the lubricant reservoir groove 28 has a groove bottom 31 which is formed by an outer-diameter-side end of the butting surface 27, two flat bottom surfaces 34 on both sides, and arc-shaped groove wall surfaces 29 reaching the bottom surfaces 34. Therefore, the groove bottom 31 in this case has a predetermined width.

Each groove wall surface 29 is provided by an arc surface which merges gently at its boundary 33 with a cylindrical surface 32 of a curvature radius R1, and has a gradually decreasing curvature radius R2 starting from the boundary 33 toward the bottom surface 34.

In comparison to Embodiment 1, the groove bottom 31 is wider by as much as the bottom surface 34, which increases the amount of lubricant held therein, and thus provides further improved lubrication. The halves can be manufactured in the same method, have the same function, and provide the same advantages, so these will not be repeated here.

Embodiment 3

Figure 6:
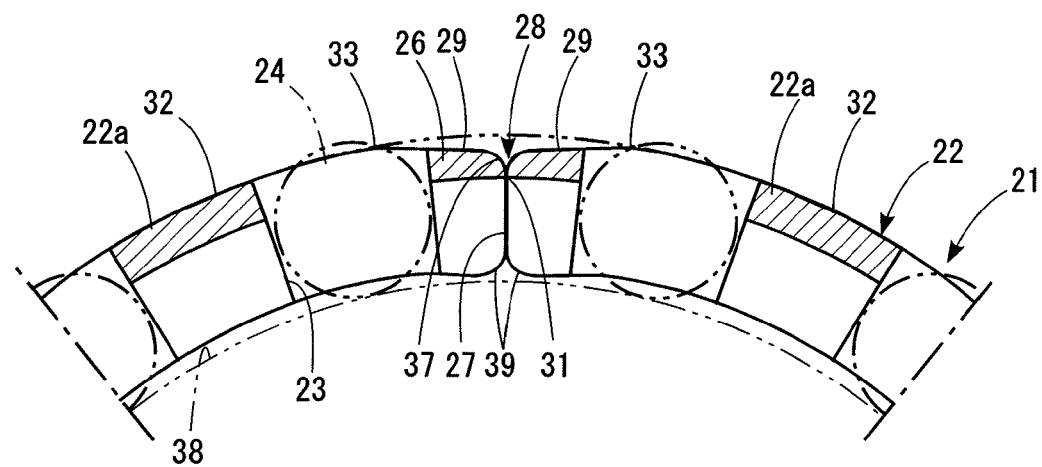
FIG. 6 is an enlarged fragmentary front view in vertical section of a retainer roller bearing according to Embodiment 3.
Figure 7:
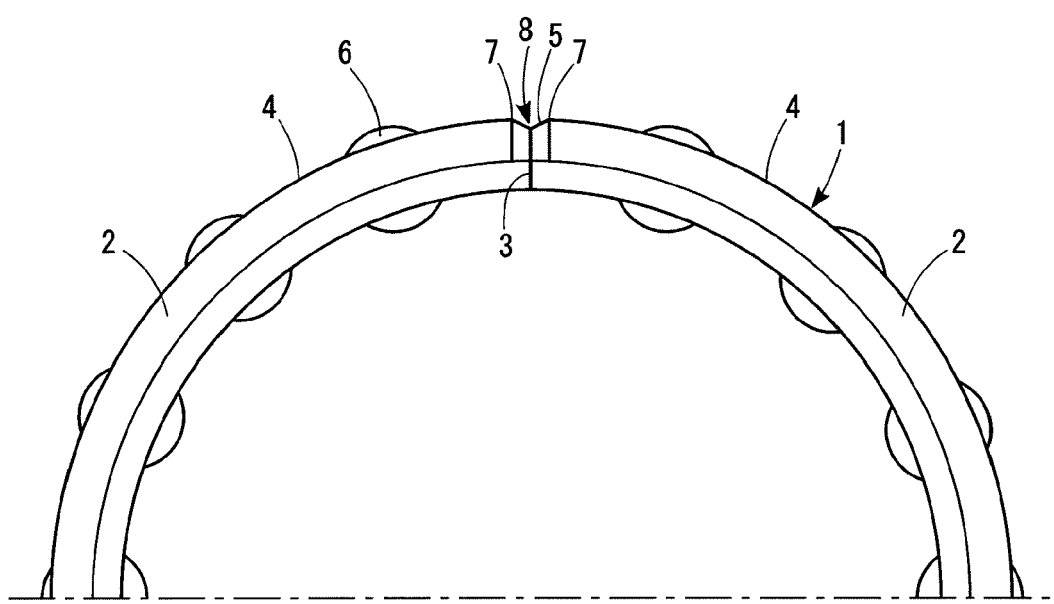
FIG. 7 is a front view of a retainer roller bearing according to Prior art 1.
Figure 8:
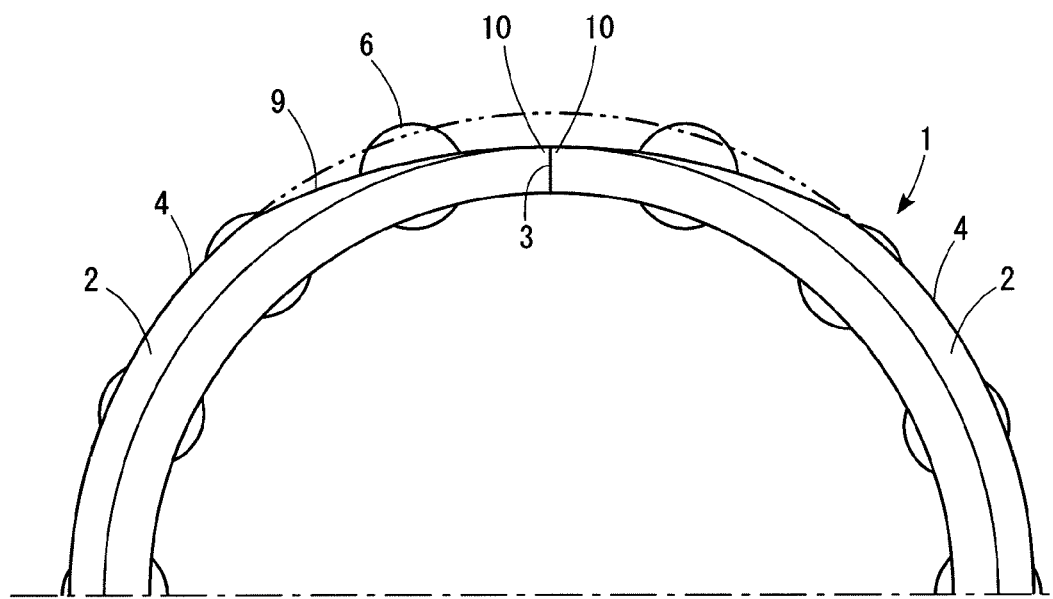
FIG. 8 is a front view of a retainer roller bearing according to Prior art 2.
Figure 9:
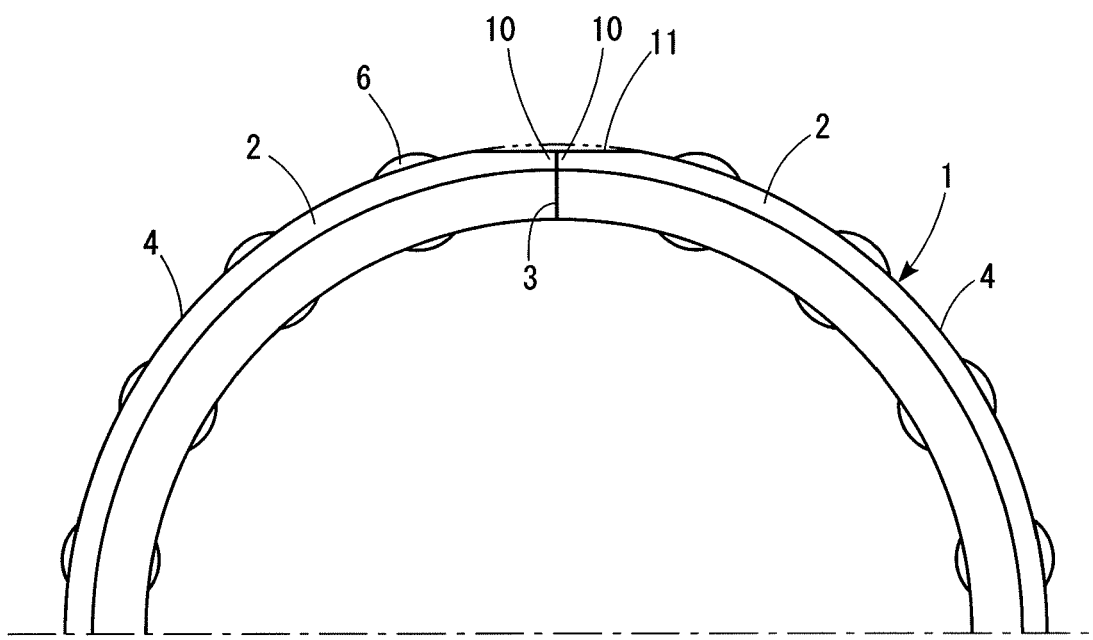
FIG. 9 is a front view of a retainer roller bearing according to Prior art 3.

FIG. 6 shows a two-piece retainer 22 and a retainer roller bearing 21 including the same according to Embodiment 3, in which a bending process is performed to each of the regions ranging from a boundary 33 between a cylindrical surface 32 and a groove wall surface 29 to the butting surface 27, as means for forming groove wall surfaces 29 at two end portions of each semi-annular retainer part 22a. Each groove wall surface 29 is shaped as a gentle slope. The bending is performed only to an extent which will not allow any inner diameter portions of the butting surface 27 to make contact with a crank pin 38.

The butting surface 27 has an angled portion on its outer diameter side. Since this portion is likely to cut the film of lubricant and cause loss of lubricant, a round chamfer 37 is provided. The bending process creates a sloped surface which provides, together with the round chamfer 37, a groove wall surface 29. When the two round chamfers 37 are butted together, a groove bottom 31 is formed. The groove bottom 31 and two groove wall surfaces 29 each including the round chamfer 37 form a lubricant reservoir groove 28. Preferably, a round chamfer 39 should also be provided to an inner-diameter-side angled portion of the butting surface 27. The present embodiment offers the same functions and advantages as offered by the previous embodiments, so these will not be restated here.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

REFERENCE SIGNS LIST 21 roller bearing
22 retainer
22a retainer part
23 pocket
24 roller
25 annular portion
26 pillar portion
27 butting surface
28 lubricant reservoir groove
29 groove wall surface
30 bent recess
31 groove bottom
32 cylindrical surface
33 boundary
34 bottom surface
35 conrod large end
36 lubricant
37 round chamfer
38 crank pin
39 round chamfer

The invention claimed is:

1. A two-piece retainer provided by an annular assembly of a pair of semi-annular retainer parts each representing a half of the retainer and having a predetermined number of roller holding pockets, wherein the two retainer parts as assembled together provide a groove wall surface on each side of their shared butting surface on an outer diameter surface of each of the retainer parts, each of the groove wall surfaces being provided by an arc surface continuing gently to a cylindrical surface of the retainer part, with a groove bottom formed in a region including the shared butting surface of the retainer parts, the groove wall surfaces on the two sides and the groove bottom forming a lubricant reservoir groove.

2. The two-piece retainer according to claim 1, wherein the semi-annular retainer parts are symmetrical to each other, being made by dividing an annular retainer material, which has two annular portions opposed axially to each other, a predetermined number of pillar portions connecting these annular portions and the pockets provided between the pillar portions, into two pieces along a plane which passes through a center of symmetry and two of the pillar portions.

3. The two-piece retainer according to claim 1, wherein the arc surface of each groove wall surface has a gradually decreasing curvature radius from its boundary with the cylindrical surface to the butting surface.

4. The two-piece retainer according to claim 1, wherein the groove wall surfaces on both sides of the butting surface are in a left-right symmetry with respect to the butting surface.

5. The two-piece retainer according to claim 1, wherein the groove wall surfaces reach the butting surface, with the butting surface's outer-diameter-side end providing the groove bottom.

6. The two-piece retainer according to claim 1, wherein the groove bottom is provided by the outer-diameter-side end of the butting surface and bottom surfaces on both sides of the butting surface, the groove wall surfaces reaching the bottom surface.

7. The two-piece retainer according to claim 6, wherein the bottom surfaces which form the groove bottom are provided by flat surfaces.

8. The two-piece retainer according to claim 1, wherein the semi-annular retainer parts are made by cutting an annular retainer material into two pieces, the annular retainer material being formed with lubricant reservoir grooves in a symmetrical pattern in advance.

9. The two-piece retainer according to claim 1, wherein the semi-annular retainer parts are made by cutting an annular retainer material into two pieces, then bending each end portion to form the groove wall surfaces, and then providing round chamfering to each groove wall surface to remove angled portions.

10. The two-piece retainer according to claim 1, wherein the semi-annular retainer parts are formed of a resin by an injection molding process.

11. A roller bearing comprising the two-piece retainer according to claim 1.

* * * * *